(12) United States Patent  
Proebstle

(10) Patent No.: US 9,718,419 B2
(45) Date of Patent: Aug. 1, 2017

(54) MOTOR VEHICLE HAVING A JUMP-START DEVICE BETWEEN AT LEAST TWO ON-BOARD ELECTRIC POWER SYSTEMS

(71) Applicant: Bayerische Motoren Werke Aktiengesellschaft, Munich (DE)

(72) Inventor: Hartmut Proebstle, Wuerzburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 784 days.

(21) Appl. No.: 13/957,472

(22) Filed: Aug. 2, 2013

(65) Prior Publication Data

US 2013/0314041 A1 Nov. 28, 2013

Related U.S. Application Data

(63) Continuation of application No. PCT/EP2012/051201, filed on Jan. 26, 2012.

(30) Foreign Application Priority Data

Feb. 3, 2011 (DE) .................. 10 2011 003 564

(51) Int. Cl.
*B60R 16/03* (2006.01)
*F02N 11/14* (2006.01)
(Continued)

(52) U.S. Cl.
CPC .......... *B60R 16/03* (2013.01); *B60L 11/1809* (2013.01); *F02N 11/087* (2013.01);
(Continued)

(58) Field of Classification Search
CPC ............. F02N 11/0866; F02N 11/0862; F02N 11/087; F02N 11/14; F02N 2200/061;
(Continued)

(56) References Cited

U.S. PATENT DOCUMENTS 5,696,434 A * 12/1997 Dennett ................. H01H 19/58
307/71
6,211,577 B1 4/2001 Alksnat et al.
(Continued)

FOREIGN PATENT DOCUMENTS

DE 199 22 330 C1 12/2000
DE 100 63 289 A1 7/2001
(Continued)

OTHER PUBLICATIONS

English Machine Translation of DE19922330.*
(Continued)

*Primary Examiner* — Richard Isla Rodas
*Assistant Examiner* — Manuel Hernandez
(74) *Attorney, Agent, or Firm* — Crowell & Moring LLP

(57) ABSTRACT

A motor vehicle having a jump-start device is equipped with an internal combustion engine with a starter motor, and at least two on-board electrical power subsystems which are coupled together via an electric coupling element. Each on-board electrical power subsystem has at least one rechargeable electrical energy storage device. The motor vehicle has a jump-start support terminal, wherein the jump-starting device has a multi-stage jump-start switch. The on-board electrical power subsystems and the jump-starting support terminal are galvanically isolated when a first switching stage of the jump-start switch is selected, and the on-board electrical power subsystems and the jump-starting support terminal are galvanically connected when a second switching stage of the jump-start switch is selected.

10 Claims, 4 Drawing Sheets

(51) Int. Cl.
*B60L 11/18* (2006.01)
*F02N 11/08* (2006.01)

(52) U.S. Cl.
CPC .......... *F02N 11/0866* (2013.01); *F02N 11/14* (2013.01); *F02N 11/0862* (2013.01); *F02N 2200/06* (2013.01); *F02N 2200/061* (2013.01); *F02N 2200/063* (2013.01)

(58) Field of Classification Search
CPC .......... F02N 2200/06; F02N 2200/063; B60L 11/1809; B60L 2200/26; B60R 16/03
USPC ....................................................... 320/109
See application file for complete search history.

(56) References Cited

U.S. PATENT DOCUMENTS

| | | | |
|---|---|---|---|
| 6,281,600 B1 | 8/2001 | Hough et al. | |
| 6,320,358 B2 | 11/2001 | Miller | |
| 6,396,240 B1 | 5/2002 | Kahlon et al. | |
| 6,642,633 B1 * | 11/2003 | Yang | H01M 2/1083 307/10.1 |
| 7,513,323 B2 | 4/2009 | Gronbach | |
| 2003/0155814 A1 * | 8/2003 | Gronbach | B60L 11/1868 307/130 |

FOREIGN PATENT DOCUMENTS

| | | |
|---|---|---|
| DE | 101 19 985 A1 | 10/2002 |
| DE | 103 44 563 A1 | 4/2005 |
| DE | 10 2005 038 576 A1 | 11/2006 |
| EP | 1 067 648 A2 | 1/2001 |
| WO | WO 02/087068 A1 | 10/2002 |

OTHER PUBLICATIONS

International Preliminary Report on Patentability (PCT/IB/373), including Written Opinion (PCT/ISA/237) dated Aug. 6, 2013 (seven (7) pages).

German-language Search Report dated Sep. 23, 2011 with partial English translation (Nine (9) pages).

International Search Report dated Apr. 24, 2012 with English translation (Six (6) pages).

* cited by examiner

MOTOR VEHICLE HAVING A JUMP-START DEVICE BETWEEN AT LEAST TWO ON-BOARD ELECTRIC POWER SYSTEMS

CROSS REFERENCE TO RELATED APPLICATIONS

This application is a continuation of PCT International Application No. PCT/EP2012/051201, filed Jan. 26, 2012, which claims priority under 35 U.S.C. §119 from German Patent Application No. DE 10 2011 003 564.8, filed Feb. 3, 2011, the entire disclosures of which are expressly incorporated by reference herein.

BACKGROUND AND SUMMARY OF THE INVENTION

The invention relates to a motor vehicle having a jump-start device, wherein the motor vehicle has an internal combustion engine with a starter motor, the motor vehicle is equipped with at least two on-board electrical power subsystems which are coupled together via an electric coupling element, each on-board electrical power subsystem has at least one rechargeable electrical energy storage device, and the motor vehicle has a jump-start support terminal.

In general, the on-board electrical power supply of motor vehicles is equipped with a start battery, to start the engine by means of a starter motor, and to supply consumers with electrical power when the alternator does not sufficiently meet the needs for electrical power. As such, the duties of the starter battery go beyond simply starting the engine, such that the starter battery in the modern development of vehicles is called the on-board electrical power supply battery, or SLI battery, for Starting, Lighting, and Ignition. If a battery failure or battery defect occurs, the vehicle can be jump-started and/or the battery can be recharged. In the case of jump-starting and also recharging, an external current and voltage source, such as a charging device or the on-board battery of another vehicle (the donor vehicle), for example, is galvanically connected to the battery of the receiving vehicle. The electrical connection is established with conducting cables. A conducting cable set consists of two insulated conductors which terminate in clamps or pincers which are designed for the size of standard battery poles (see Standard EN 50342-2 "Lead-acid starter batteries: Dimensions of batteries and marking of terminals" and the DIN 72553 Standard "Battery jumper cable for road vehicles with combustion engines; dimensions, requirements, testing"). The positive conductor of the cable set connects the positive potentials, meaning by way of example the two plus poles of the receiving and donor batteries, or the plus pole of the receiving battery to the plus output of a charging device. The minus conductor establishes a shared connection to ground.

During a jump-start, high currents flow (near to the range of kiloamps), such that the conductors of the cable set have a corresponding large cross-section. In many vehicle models, the battery poles are not easily accessible—when installed in the trunk, for example. In this case, the plus pole of the battery is not contacted; rather a terminal which is galvanically connected to the plus conductor of the battery is contacted. This terminal is called a jump-starting support terminal, and is a connection which is designated in the vehicle and/or the vehicle owner's manual for the intended use of recharging and jump-starting, and is easily accessible from outside. It is typically located in the region of the engine compartment, and is easily accessible after the engine hood has been opened to connect a pole clamp. By way of example, a jump-starting circuit for a vehicle having a starter battery, said circuit being protected against the reversal of polarity, is described in U.S. Pat. No. 6,211,577 B1.

In addition, modern motor vehicles have an engine starting and stopping function, for engine drives which are purely based on internal combustion as well as electrically combined, hybrid drives with an applied voltage of 12 volts, meaning that the engine is stopped in suitable driving situations during operation of the vehicle, and is started again after a short period of time. Examples of this can be waiting at a red light or at a railroad crossing. Halting the operation of the engine leads to fuel savings. Due to the more frequent number of engine starts compared to vehicles with a stop-start function, and to the necessity of supplying electrical consumers with power via the battery during the time that the engine is stopped during operation of the vehicle, the vehicle battery is subjected to great demands.

For this reason, vehicles with a start-stop function, or also vehicles with a high base electrical load, such as public or governmental vehicles, are frequently equipped with a second on-board electrical power supply which has its own battery, the same commonly being called auxiliary battery. The on-board electrical power subsystem, with the auxiliary battery, is separated from the on-board electrical power subsystem having the primary battery, the same also being called the base battery, by a battery cutoff relay and/or a DC converter. A cost-optimized variant is the use of a unidirectional DC converter without a battery cutoff relay. The DC converter is supplied with electricity by the on-board electrical power subsystem which has the primary battery, and transmits electrical power from its base on-board power supply input to its auxiliary on-board power supply output. Generally, the engine control unit is included in the input-side on-board power supply having the primary battery, and the starter motor is included in the output-side on-board power supply having the auxiliary battery. In U.S. Pat. No. 6,396,240 B1, a jump-starting device is described which has a third battery, for a vehicle having two on-board power supply batteries coupled via a DC converter.

A problem addressed by the invention is that of providing an improved jump-starting device in a motor vehicle having at least two on-board electrical power subsystems.

This problem is addressed by a jump-starting device according to the invention, wherein the jump-starting device is characterized by a multi-stage jump-starting circuit which galvanically separates the on-board electrical power supply and the jump-starting support terminal from each other when a first switching stage is selected, and which galvanically connects the on-board electrical power supply and the jump-starting support terminal to each other when a second switching stage is selected.

One advantage of the invention is that during normal operation of the vehicle, the on-board electrical power subsystems can be operated while galvanically isolated from each other. A power and energy management system implemented in the software of the vehicle mediates between the two on-board electrical power subsystems as an electrical coupling, via the DC converter. In exceptional situations, such as the vehicle being left a long time, for example, the on-board electrical power subsystems can be galvanically connected to each other by selecting the second switching stage of the jump-start switch. If, by way of example, one energy storage device has a deficiency of charge, an internal charge compensation can take place by means of the other energy storage device or the other energy storage devices.

According to one embodiment of the invention, the electrical coupling element which couples the on-board electrical power subsystems to each other is designed as a DC converter and/or a relay or switch.

No restriction shall be made on the general applicability of the invention if only a DC converter is presented in the present description.

According to one embodiment of the invention, it is possible to make an electrical contact with the jump-starting support terminal upon selection of the second switching stage of the jump-start switch, in order to charge the rechargeable electrical energy storage device, by an external voltage source, via the jump-starting support terminal.

This embodiment has the advantage that the jump-starting device enables the recharging of all energy storage devices by an external voltage source. All energy storage devices are galvanically connected to the external voltage source, such that the charging power is limited by the charge absorption capacity of the energy storage device or by the current releasing capacity of the external voltage source.

According to a further variant of the invention, it is possible to make an electrical contact with the jump-starting support terminal upon selection of the second switching stage of the jump-start switch, in order to supply the starter motor with electrical power from an external voltage source for a jump-start of the internal combustion engine.

This has the special advantage that the motor vehicle can be jump-started by an external voltage source, such as a charging device or a starter battery of a donor vehicle, for example. In the second switching stage of the jump-start switch, all on-board electrical power subsystems and therefore all energy storage devices are galvanically connected to the external power source. A jump-start can also be carried out if all energy storage devices have been fully discharged—for example as the result of standing for a long time. The jump-starting device makes it possible for all control devices required for a start to be energized regardless of the specific topology of the on-board electrical power supply—i.e. regardless of which on-board electrical power subsystems the control devices are integrated in. In addition, the starter motor can be supplied with the very high starting current for an engine start of approx. one kiloamp, by the external current source.

According to a particularly preferred embodiment of the invention, the jump-starting support terminal is designed with a substantially cylindrical shape, meaning that it has a cylindrical base shape. The jump-start switch is designed with a substantially circular shape, meaning that it has a circular base shape. The jump-start switch encloses the jump-starting support terminal with a galvanic connection. The jump-starting support terminal and the jump-start switch have a shared pressure mechanism and/or a rotary mechanism by means of which the jump-start switch can be fixed in one of at least two prespecified setting positions with respect to the jump-starting support terminal.

The embodiment of the jump-starting device offers the advantage that the jump-starting support terminal is integrated into the jump-start switch, and there is a conductive connection between these two components.

According to one implementation of the present invention, wherein the first switching stage of the jump-start switch is selected, the jump-start switch is fixed relative to the jump-starting support terminal in an upper position, and when the second switching stage of the jump-start switch is selected, the jump-start switch is fixed in a lower setting position relative to the jump-starting support terminal. When the jump-start switch is fixed in the upper setting position, the peripheral surface of the cylindrical base shape of the jump-starting support terminal is geometrically shielded. When the jump-start switch is fixed in the lower setting position, the peripheral surface of the cylindrical base shape of the jump-starting support terminal is geometrically, and at least partially freely, accessible to make an electrical contact.

This configuration ensures that the jump-starting support terminal cannot be contacted with a clamp or pincer of a conventional starter cable or jumper cable when in the upper setting position. When in the lower setting position, the jump-starting support terminal integrated into the jump-start switch is exposed, such that its peripheral surface can be gripped by a clamp or pincer.

According to a further preferred embodiment, the jump-starting support terminal is connected to a non-conducting holder. An elastic spring element functions to provide return force, in the axial direction of the jump-starting support terminal, between the holder and the jump-start switch.

The elastic spring element exerts a force on the jump-start switch which is oriented away from the holder.

In addition, the jump-start switch can have at least one attached locking pin on the side of the circular base shape of the jump-start switch which faces toward the jump-starting support terminal, and the locking pin faces in the direction leading away from the radial center of the circular base shape of the jump-start switch and of the cylindrical base shape of the jump-starting support terminal.

The jump-starting support terminal preferably has a recessed first groove for each locking pin. The first groove guides the locking pin in the form of a tongue and groove connection in the axial direction of the jump-starting support terminal. The locking pin can be fixed in the upper setting position on the end of the recessed first groove which faces opposite the holder, by means of the return force of the elastic spring element. For each locking pin, the jump-starting support terminal has one recessed second groove which is oriented perpendicular to the first groove and which transitions into the first groove in an L shape on the end of the first groove which faces the holder. The second groove guides the locking pin in the form of a tongue and groove connection perpendicularly to the axial direction, and perpendicularly to the direction leading away from radial center of the cylindrical base shape of the jump-starting support terminal. This means that the second groove guides the jump-start switch around the jump-starting support terminal in a rotational manner. The locking pin can be fixed in the lower setting position in the second groove by means of the return force of the elastic spring element.

This embodiment of a tongue and groove connection between the locking pin or the locking pins and the grooves functions so that the jump-start switch can be brought into the upper setting position from the lower setting position in a reversible manner. The setting of the lower setting position proceeding from the upper setting position can be achieved in that a pressing movement of the jump-start switch in the direction of the holder is followed by a first rotary movement. Upon the pressing movement, the locking pin or locking pins guide the jump-start switch relative to the axial direction of the jump-starting support terminal until the recessed end, the same facing the holder, of the first groove is reached, and the locking pin or the locking pins can be guided into the second groove. If the pin or the pins are in the second groove, the jump-start switch is in the lower setting position relative to the jump-starting support terminal. The first rotary movement can be executed up to the point when the pin or the pins reach the recessed end, the same facing opposite the first groove, of the second groove. If the jump-starting support terminal has the combination of the first and the second groove implemented at least two times in the configuration, assurance can only be given that the rotary movement can technically be carried out if a second groove is located precisely between two first grooves. The setting of the upper setting position proceeding from the lower setting position can be achieved in that a second rotary movement which runs in the opposite direction of the first rotary movement is executed, until the pin or the pins reach the first end of the recessed second groove, said end facing the first groove, and are transitioned over into the first groove. The return force of the elastic element moves the jump-start switch relative to the jump-starting support terminal into the upper setting position.

According to a further variant of the invention, one conducting element is stamped onto the non-conducting holder for each on-board electrical power subsystem, wherein each on-board electrical power subsystem is galvanically connected by means of said conducting element. The conducting elements are galvanically isolated from each other. The jump-start switch is galvanically isolated from the conducting elements when the first switching stage of the jump-start switch is selected. When the second switching stage of the jump-start switch is selected, the jump-start switch is galvanically connected to the conducting elements.

This variant ensures that when the second switching stage of the jump-start switch is selected, the jump-starting support terminal has a conductive connection to the on-board electrical power subsystems. When the first switching stage of the jump-start switch is selected, the jump-starting support terminal is isolated from the on-board electrical power subsystems.

The invention is based on the considerations presented as follows.

In order to supply a motor vehicle with external current and voltage, the on-board electrical power supply of the vehicle has a jump-starting support terminal. Via the same, the on-board battery can be charged by means of an external voltage source or an external battery, for example in the production factory, during or after a long period of non-use, or when in a workshop.

The jump-starting support terminal is inadequate in vehicles with on-board electrical power supplies which have multiple energy storage devices. These are, for example, vehicles with start-stop functionality which have an additional auxiliary on-board electrical power supply with its own electrical energy storage devices as auxiliary batteries or auxiliary energy storage devices, said auxiliary on-board electrical power supply being separated from the base on-board electrical power supply via a switch or a unidirectional DC converter. The base on-board electrical power supply and the auxiliary on-board electrical power supply are electrically coupled to each other by the DC converter, but are galvanically isolated from each other. The electrical power transferred from the battery in the base on-board electrical power supply to the battery in the auxiliary on-board electrical power supply is determined by the specification of the DC converter. Typically, the DC converter is designed according to considerations of cost and constructed space for the normal operation of the vehicle. The sizing of the converter is determined on the basis of the average power to be recharged during the driving time, and is typically in the range of several hundred watts. The converter is typically designed as unidirectional and only enables a flow of energy from the on-board electrical power supply to the auxiliary battery. If, by way of example, both batteries have been fully discharged, such that both batteries must be recharged, the design of the DC converter prevents a recharging of the batteries within a reasonable period of time. Particularly the electrical power required for a start of the internal combustion engine, with brief (a period of several milliseconds) 600 to 800 amp [loads], cannot be transferred. This is also the case for auxiliary batteries which are no longer capable of a start, are defective, or have high resistance. The conventional connection of the jump-starting support terminal to the basic on-board electrical power supply enables charging the base battery externally, with a charging power which is typically on average a few hundred Watts, but does not allow an adequate charging of the auxiliary battery in a short time. As a result, it is not able to start the vehicle within a short time. From the opposite perspective, the connection of the jump-starting support terminal to the auxiliary on-board electrical power supply makes a bi-directional DC converter necessary for charging a discharged on-board battery. In addition, there is no option to galvanically connect the two on-board electrical power supplies via an electrical switch upon a complete failure of the voltage supply in one or both of the on-board electrical power subsystems, because the switch itself cannot be switched when the voltage supply in the vehicle fails. In addition, the jump-starting support terminal, in combination with an electrical switch, must by necessity be on the side of the power supply network which supplies the switch. If only the battery in the power supply network which supplies the switch fails, an external voltage source must be used, because no internal compensation charging occurs via the other battery when the switch is open.

One suitable measure for ensuring to the greatest degree possible the ability of the vehicle to be jump-started and to be charged externally is the integration of a mechanical switch element for the purpose of connecting the on-board electrical power supplies for an external charging or for a jump-start. The integration of the mechanical switch element is preferably realized together with a mechanical logic device added to the jump-starting support terminal, said logic device only enabling an external conductive connection to the jump-starting support terminal, and the further on-board electrical power supply, if the on-board electrical power subsystems are galvanically connected to each other.

The integration of such a mechanical switch element comes with various advantages. The configuration ensures an effective external emergency power supply to one of the on-board electrical power subsystems when another on-board electrical power subsystem fails. A vehicle operator can carry out a jump-start as before. All on-board electrical power subsystems are supplied with electrical power via an access point from outside. When the vehicle is in the service workshop or in the vehicle production plant, all of the batteries can be charged with a single charging device.

Other objects, advantages and novel features of the present invention will become apparent from the following detailed description of one preferred embodiment when considered in conjunction with the accompanying drawings.

DETAILED DESCRIPTION OF THE DRAWINGS

Figure 2:
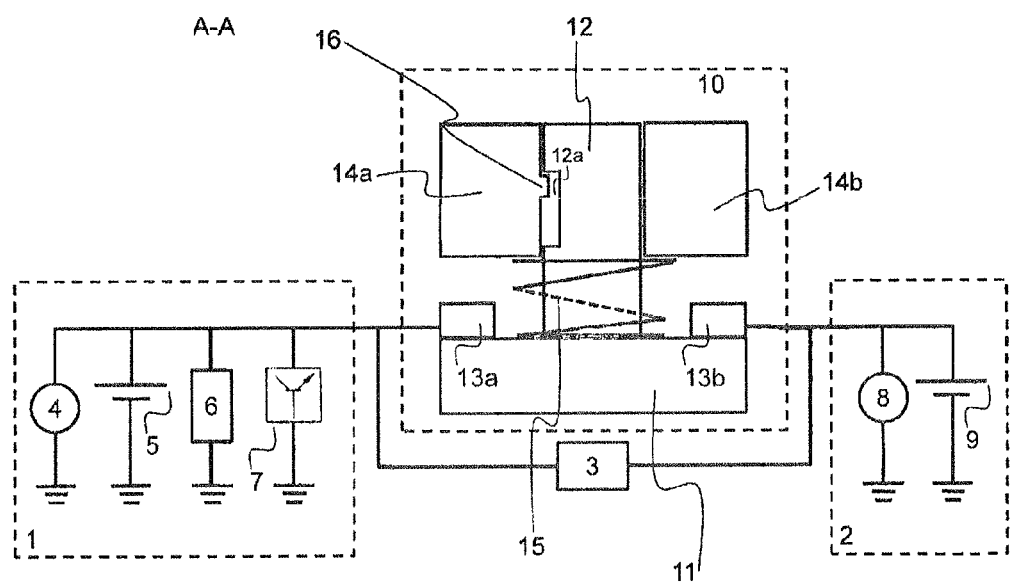
FIG. 2 is a schematic diagram showing a jump-starting device with a counter-sunk jump-starting support terminal, in a schematic cutaway view.
Figure 3:
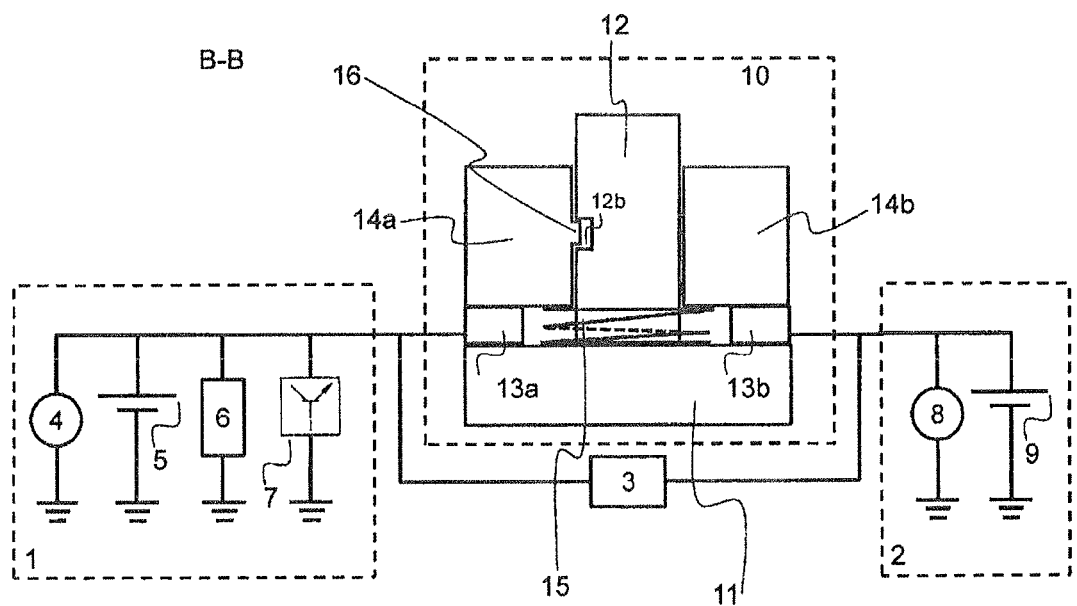
FIG. 3 is a schematic diagram showing a jump-starting device with a freely accessible jump-starting support terminal, in a schematic cutaway view.

All figures use the same reference numbers as given in the list of reference numbers. FIG. 2 makes a reference to the cut line A-A in FIG. 4; FIG. 3 makes a reference to the cut line B-B in FIG. 4.

Figure 1:
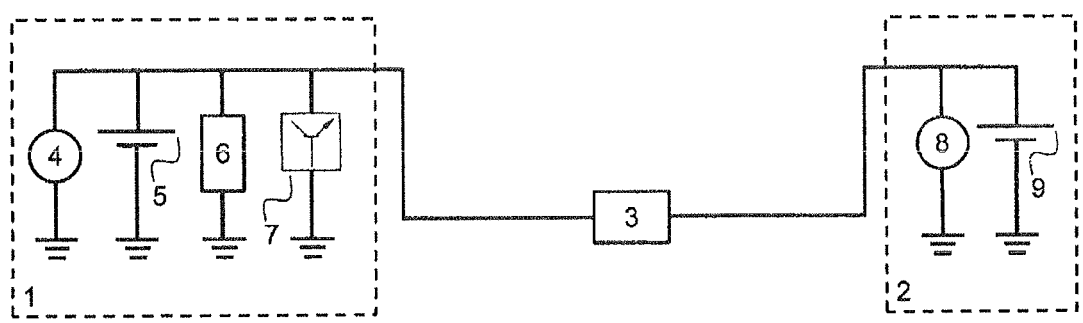
FIG. 1 is a schematic diagram showing two on-board electrical power subsystems with a DC converter.

FIG. 1 shows a topological overview of the on-board electrical power supply of a motor vehicle having two on-board electrical power subsystems. The first on-board electrical power subsystem (1) is termed the base on-board electrical power supply and has a nominal voltage level of 14 volts. It has an alternator (4) driven by an internal combustion engine, which supplies the electrical consumers (6) and control devices, such as the engine control unit (7) for example, with electrical power. An electrical energy storage device, shown here as an on-board battery (5), can be charged by the alternator during the operation of the vehicle. A second on-board electrical power subsystem (2) with a nominal voltage level of 14 volts is connected to the base on-board electrical power subsystem via a unidirectional DC converter (3) in the 150 Watt class. The operating voltage of the DC converter is provided by the base on-board electrical power subsystem. The base on-board electrical power subsystem is connected to the input of the converter, and the second on-board electrical power subsystem is connected to the output of the DC converter. The second on-board electrical power subsystem is called the auxiliary on-board electrical power subsystem and has an electric energy storage device (9) which is called the auxiliary battery. The auxiliary battery supplies the starter or starter motor (8) of the internal combustion engine in particular.

Figure 4:
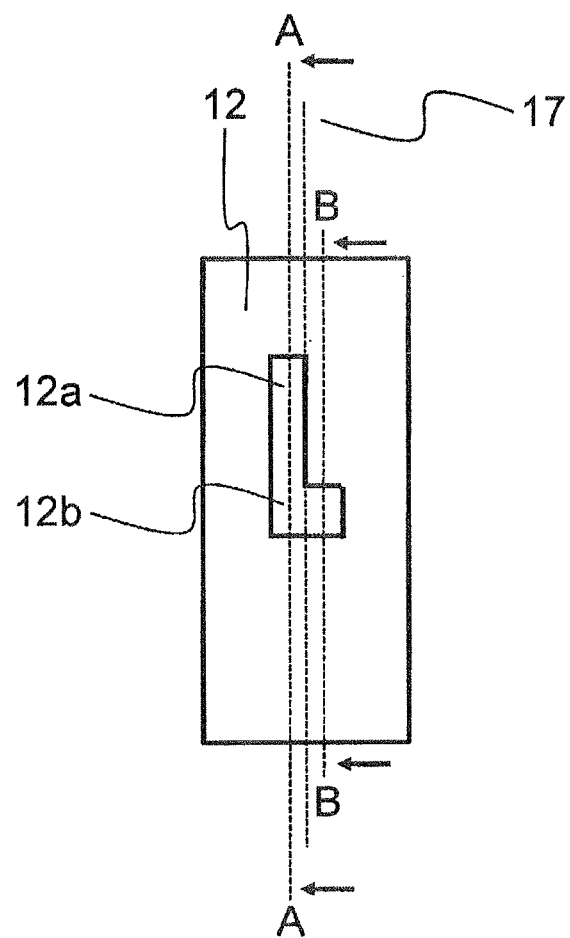
FIG. 4 is a schematic diagram showing a jump-starting support terminal with grooves.

FIG. 2 shows a jump-starting device (10) having a counter-sunk jump-starting support terminal, in a schematic cutaway view. Both of the on-board electrical power subsystems are arranged topologically as in FIG. 1. The jump-start device is arranged electrically in parallel to the DC converter. The jump-starting device has an insulating holder (11). Two metal contacts (13a, 13b) are stamped onto the holder and are galvanically isolated from each other, but are each connected to one of the two on-board electrical power subsystems. These metal contacts, which are indicated as on-board electrical power supply contacts, are galvanically isolated from a jump-starting support terminal (12) which is likewise attached on the holder. The jump-starting support terminal is substantially metallic and has a cylinder-like base shape. The jump-starting support terminal is illustrated schematically in detail in FIG. 4. The jump-starting support terminal has a cylinder axis. The cylinder axis lies in the plane of the cut line A-A; and the view thereof which the arrow indicates in FIG. 4 is illustrated in FIG. 2. The cut line A-A passes through a recessed first groove (12a) in the jump-starting support terminal, said groove (12a) being indicated as a guide groove. A recessed second groove (12b) in the jump-starting support terminal continues on the end of the guide groove which faces toward the holder, and is indicated as the locking groove. The locking groove leads along the peripheral surface and perpendicular to the guide groove, such that a groove with an overall L shape is apparent on the jump-starting support terminal. The cut line B-B, wherein the cylinder axis of the jump-starting support terminal lies in the plane thereof, passes through the locking groove. The view of the cut line B-B indicated in FIG. 4 with arrows is illustrated in FIG. 3.

FIG. 3 shows the jump-starting device with the jump-starting support terminal, the peripheral surface of which is at least partially freely accessible. The jump-starting support terminal in FIG. 3 and FIG. 2 is surrounded by a substantially metallic component (14a, 14b) with a substantially circular base shape. The circular component is indicated as the jump-start switch. An attached locking pin (16) is positioned on the inner side of the jump-start switch, and can be designed with a circular or square cross-section. The locking pin is guided in the guide groove and the locking groove. The diameter of the locking pin, or its edge length, is matched to the width of the grooves. An elastic element (15), which can be designed as a coil spring, is clamped between the jump-start switch and the holder.

In FIG. 2, the coil spring presses the jump-start switch, guided by the locking pin in the guide groove, against the holder, in the direction of the end of the jump-starting support terminal facing away from the holder. As soon as the locking pin reaches the end of the recessed guide groove which is opposite the holder, the jump-start switch is fixed relative to the jump-starting support terminal. The position of the locking pin on the inner side of the jump-start switch is determined in such a manner that in this upper setting position, the side of the jump-start switch which faces away from the holder is flush with the jump-starting support terminal, such that the peripheral surface of the jump-starting support terminal on the end of the jump-starting support terminal which faces away from the holder is not accessible. In addition, the jump-start switch in the upper setting position does not touch the on-board electrical power supply contacts. For this reason, it is not possible for a voltage or current source to be permanently connected to the contactless jump-start switch with the on-board electrical power subsystems.

The accessible jump-start switch can be manually pressed in the direction of the holder, against the force of the coil spring, which can also be designed as a rubber spring. This pressing movement is guided by the locking pin in the guide groove until the locking pin comes to the end of the guide groove facing the holder. In this position, the locking pin enters the locking groove by means of a subsequent rotary movement of the jump-start switch relative to the jump-starting support terminal. The rotary movement can be continued until the locking pin comes to the end of the recessed locking groove opposite the guide groove. In this lower setting position, the jump-start switch is fixed relative to the jump-starting support terminal in such a manner that the peripheral surface of the jump-starting support terminal is accessible from the end of the jump-starting support terminal opposite the holder, at least to a degree which is sufficient to enable a standardized clamp or pincer of a jumper cable to be attached thereto for a long period of time. The height of the circular structure of the jump-start switch is exactly determined such that the side of the jump-start switch facing the holder touches the two on-board electrical power supply contacts, such that a galvanic contact is established.

In summary, FIG. 2 shows the jump-start switch in the upper setting position in which the jump-starting support terminal is dropped, and FIG. 3 shows the jump-start switch in the lower setting position, in which the jump-starting support terminal is accessible. By means of the combination of a pressing- and rotating movement, both setting positions can be transitioned into each other in a reversible manner. In the upper setting position, a galvanic isolation exists between the base on-board electrical power supply and the auxiliary on-board electrical power supply. The electrical coupling of the two on-board electrical power subsystems is realized exclusively via the unidirectional DC converter. In the lower setting position, there is a long-term and low-resistance galvanic connection between the on-board electrical power subsystems and the jump-starting support terminal, via the jump-start switch. The lower setting position is selected to give the motor vehicle help starting, or to carry out an external charging. The design of the jump-starting device enables the access to the jump-starting support terminal, for the charging of the on-board battery and the auxiliary battery by means of an external donor battery, an external charging device, or another type of external voltage and current source having a suitable voltage level, only when the jump-start switch is in the lower position. Only once the lower setting position is selected can an external voltage source be connected. If an external voltage source is connected between the exposed jump-starting support terminal and the ground of the vehicle, when the jump-start switch is in the lower setting position, wherein the positive potential of the source is connected to the jump-starting support terminal and the negative potential of the source is connected to vehicle ground, the on-board battery and the auxiliary battery are charged by the external power source. The power absorbed by the batteries, and therefore the charging time thereof, is limited by their charge absorption capacity or by the current releasing capacity of the external power source, given a fixed charging voltage. In contrast to topologies with only one separate jump-starting support terminal for one on-board electrical power subsystem, the DC converter is galvanically bridged when in the lower setting position, such that the power which can be transferred by the DC converter does not constitute a limitation for the charging or for a jump-start. A jump-start of the vehicle may be necessary for various different reasons. By way of example, the auxiliary battery can be defective or can be so fully discharged that the high current required for an engine start cannot be provided by the auxiliary battery. In addition, the on-board battery can be defective or so fully discharged that the ignition cannot be activated by the on-board battery and/or the engine controller cannot be turned on by the on-board battery, to start the vehicle. As a result of a long period of non-use, both batteries may be defective or fully discharged. Via the jump-start device, when the jump-start switch is in the lower setting position, given an external voltage source with adequate power discharge, the ignition and the engine control unit are supplied with the required operating voltage, and the starter is supplied with the high current necessary for a start.

The jump-start device can also be strategically incorporated into the power management system of the vehicle in such an operationally advantageous manner that the vehicle driver is prompted to actuate the jump-start switch if needed, via a display/operating concept (for example a visual display in the instrument panel or in the on-board computer, or an acoustic signal). This may be necessary, by way of example, in order to quickly charge a deeply discharged battery by means of an internal charge compensation. In addition, the prompt to release the jump-start switch again, meaning to return it to the upper setting position, is displayed to the vehicle driver. If, contrary to the prompt to release the jump-start switch, the same is not released and remains locked in the lower setting position for a long time, operating states in the vehicle which require auxiliary power are blocked or deactivated.

According to one variant of this embodiment, the circular jump-start switch has an outer diameter which exceeds that which can be attained by a standardized pole clamp of a jumper cable (see the DIN 72553 standard, for example). As an alternative, a non-conducting housing, for example made of plastic, which encloses the holder, the on-board electrical power supply contacts, and the outer side of the ring-shaped jump-start switch in the upper and the lower setting position, can be attached in order to prevent a contact with the jump-start switch. In addition, the end of the jump-starting support terminal which is opposite the holder can be configured with a removable plastic cover.

According to a further advantageous embodiment, a long-term contact between an external voltage source and the jump-starting support terminal is only enabled when the polarity of the external voltage source is correct. The configuration prohibits the connection of external voltage sources to the jump-starting device with polarity reversed. A built-in protection against reversed polarity functions such that if the external voltage source is connected with reversed polarity, the locking of the jump-start switch in the lower position is released in order to release the clamps or the plug of the cable connected with reversed polarity from the jump-starting support terminal. As an alternative, if the poles are reversed, a warning tone is emitted. Also, upon a connection with reversed polarity, the jump-starting support terminal can be blown off.

According to a further embodiment, the driver can be given a visual or acoustic instruction, via a warning signal in the combined instrument, to bring the jump-start switch into the lower position. As a result, if one of the energy storage devices has a charge deficiency, a charge balancing occurs between the energy storage devices, without an external voltage source being connected.

One alternative embodiment has an electrically conductive compression spring arrangement with electrical contacts, integrated into the jump-start switch, which functions to provide additional pressing pressure on the contact surfaces between the jump-start switch and the on-board electrical power supply contacts.

In addition, the pressing and rotating mechanism of the jump-starting device can be designed alternatively. By way of example, a snap-in mechanism for retractable ball-point pens is known in general from the field of writing devices, which reversibly moves a pen cartridge out of a handle tube and drops it in the handle tube. This mechanism can be transferred to the jump-starting device by the jump-starting support terminal taking over the function of a cartridge, the jump-start switch the function of a handle tube, and the holder the function of a push button. A pressure spring, a pressure sleeve, and an advancing sleeve are integrated into the jump-starting device. The mechanism is actuated by the jump-start switch basically pressing a handle tube against the holder fixed in the vehicle when a push button is pressed.

The mechanism of the jump-starting device can be designed as a tilt, flap, or screw mechanism, by way of example. For example, a hinged plastic cover of the jump-starting support terminal can cover the jump-starting support terminal in a locked base position, and can make the same accessible when in a locked, opened position. In the opened position, a galvanic connection is established between the on-board electrical power subsystems and the jump-starting support terminal due to the appropriate arrangement of metallic contact surfaces.

LIST OF REFERENCE NUMBERS 1 base on-board electrical power supply
2 auxiliary on-board electrical power supply 3 DC converter
4 alternator
5 on-board battery
6 consumer
7 engine control unit
8 starter motor
9 auxiliary battery
10 jump-starting device
11 holder
12 jump-starting support terminal
12a guide groove
12b locking groove
13a on-board electrical power supply contact 1
13b on-board electrical power supply contact 2
14a jump-start switch, circular
14b jump-start switch, circular
15 coil spring
16 locking pin
17 cylinder axis The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having a jump-starting device, wherein the motor vehicle has an internal combustion engine with a starter motor, the vehicle is equipped with at least two on-board electrical power subsystems which are continuously coupled to each other via an electric coupling element, and is equipped with at least one rechargeable electric energy storage device per on-board electrical power subsystem, and the jump-starting device is in parallel with the electric coupling element, wherein:
    the jump-starting device has a multi-stage jump-start switch,
    the on-board electrical power subsystems and a jump-starting support terminal of the jump-starting device are galvanically isolated when a first switching stage of the jump-start switch is selected, and
    the on-board electrical power subsystems and the jump-starting support terminal are galvanically connected when a second switching stage of the jump-start switch is selected.

2. A motor vehicle according to claim 1, wherein the electrical coupling element is configured as one of a DC converter, a relay, and a switch.

3. A motor vehicle according to claim 1, wherein the jump-starting support terminal is electrically contacted when the second switching stage of the jump-start switch is selected, in order to charge the rechargeable energy storage devices from an external voltage source via the jump-starting support terminal.

4. A motor vehicle according to claim 3, wherein, the jump-starting support terminal is electrically contacted when the second switching stage of the jump-start switch is selected, in order to supply the starter motor with electrical power from an external voltage source, for a jump-start of the internal combustion engine.

5. A motor vehicle according to claim 1, wherein:
    the jump-starting support terminal is substantially designed with a cylindrical shape,
    the jump-start switch is substantially designed with a circular shape and encloses the jump-starting support terminal with a galvanic connection, and
    the jump-starting support terminal and the jump-start switch have a shared pressure mechanism and/or a rotary mechanism by which the jump-start switch is fixable in one of at least two prespecified setting positions with respect to the jump-starting support terminal.

6. A motor vehicle according to claim 5, wherein:
    when the first switching stage of the jump-start switch is selected, the jump-start switch is fixed in an upper setting position relative to the jump-starting support terminal,
    when the second switching stage of the jump-start switch is selected, the jump-start switch is fixed in a lower setting position relative to the jump-starting support terminal,
    when the jump-start switch is fixed in the upper setting position, the peripheral surface of the cylindrical basic shape of the jump-starting support terminal is geometrically shielded, and
    when the jump-start switch is fixed in the lower setting position, the peripheral surface of the cylindrical basic shape of the jump-starting support terminal is geometrically at least partially freely accessible for an electrical contact therewith.

7. A motor vehicle according to claim 6, wherein:
    the jump-starting support terminal is connected to a non-conductive holder, and
    an elastic spring element functions to provide a return force between the holder and the jump-start switch in the axial direction of the jump-starting support terminal.

8. A motor vehicle according to one claim 7, wherein:
    the jump-start switch has at least one attached locking pin on the side of the circular basic shape of the jump-start switch facing the jump-starting support terminal, and
    the locking pin faces in the direction leading away from radial center of the circular basic shape of the jump-start switch and of the cylindrical basic shape of the jump-starting support terminal.

9. A motor vehicle according to claim 8, wherein:
    the jump-starting support terminal has one recessed first groove for each locking pin,
    the first groove guides the locking pin in the form of a tongue and groove connection in the axial direction of the jump-starting support terminal,
    the locking pin can be fixed in the upper setting position on the end of the recessed first groove by means of the return force of the elastic spring element,
    the jump-starting support terminal has one recessed groove for each locking pin, which is oriented perpendicular to the first groove, and which transitions in an L shape into the first groove on the end of the first groove which is facing the holder,
    the second groove guides the locking pin in the form of a tongue and groove connection perpendicularly to the axial direction and perpendicularly to the direction leading away from radial center of the cylindrical basic shape of the jump-starting support terminal, meaning that it guides the jump-start switch around the jump-starting support terminal in a rotational manner, and
    the locking pin can be fixed in the lower setting position in the second groove by means of the return force of the elastic spring element.

10. A motor vehicle according to claim 9, wherein:
    at least one conducting element is stamped onto the non-conducting holder for each on-board electrical power subsystem, by means of which the respective on-board electrical power subsystem is galvanically connected, the conductive elements are galvanically isolated from each other, the jump-start switch is galvanically isolated from the conductive elements when the first switching stage of the jump-start switch is selected, and the jump-start switch is galvanically connected to the conductive elements when the second switching stage of the jump-start switch is selected.

\* \* \* \* \*